US006888067B1

(12) United States Patent
Howland

(10) Patent No.: US 6,888,067 B1
(45) Date of Patent: May 3, 2005

(54) CABLE SEALING APPARATUS AND METHOD

(75) Inventor: David Howland, Aptos, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/285,294

(22) Filed: Oct. 30, 2002

(51) Int. Cl.[7] ................................................ H02G 15/02
(52) U.S. Cl. ....................................... 174/74 R; 174/77
(58) Field of Search .......................... 174/92, 93, 74 R, 174/77 R, 84 R, 88 R; 439/747, 456, 598, 752.5, 467, 752, 686, 695

(56) References Cited

U.S. PATENT DOCUMENTS

| | | | | | |
|---|---|---|---|---|---|
| 4,719,321 | A | * | 1/1988 | Kozel et al. | 174/135 |
| 4,972,042 | A | * | 11/1990 | Seabourne et al. | 174/23 R |
| 5,683,272 | A | * | 11/1997 | Abe | 439/747 |
| 5,787,219 | A | * | 7/1998 | Mueller et al. | 385/134 |
| 6,046,406 | A | * | 4/2000 | Milanowski et al. | 174/77 R |
| 6,118,076 | A | * | 9/2000 | Damm et al. | 174/77 R |
| 6,402,559 | B1 | * | 6/2002 | Marowsky et al. | 439/676 |
| 6,471,547 | B1 | * | 10/2002 | Venaleck et al. | 439/608 |

* cited by examiner

*Primary Examiner*—William H. Mayo, III
(74) *Attorney, Agent, or Firm*—Townsend and Townsend and Crew, LLP

(57) ABSTRACT

Embodiments of the present invention are directed to forming a seal around cables passing through an opening of a sealed enclosure in an efficient and cost-effective manner. In one embodiment, a cable sealing apparatus has a body including a plurality of grooves and a hinge. The body is foldable around the hinge to form a plurality of cable apertures from pairs of the grooves in a folded position. The body has a resilient material to form a seal around each cable disposed in a corresponding cable aperture upon being compressed by a force moving the body to the folded position. In another embodiment, a cable sealing apparatus has a body including a plurality of cable apertures each having a length. The body has a plurality of longitudinal slits each extending along the length of one of the cable apertures and disposed between the cable aperture and an external surface of the body. Each longitudinal slit is configured to be openable to receive a cable from the external surface of the body through the longitudinal slit into the cable aperture. The body has a resilient material to form a seal around each cable disposed in a corresponding cable aperture upon being compressed by a force transverse to a corresponding longitudinal slit.

18 Claims, 4 Drawing Sheets

CABLE SEALING APPARATUS AND METHOD

BACKGROUND OF THE INVENTION

This invention relates to apparatuses and methods for forming a seal around cables that are passed through an opening of a sealed enclosure.

Traditional methods of sealing and providing strain relief to cables passing through an opening of a sealed enclosure is time consuming and expensive. They typically require a substantial amount of space. In addition, it is difficult to pass cable assemblies having connectors through the opening of the sealed enclosure such as that for a ware wash dispenser.

BRIEF SUMMARY OF THE INVENTION

Embodiments of the present invention are directed to forming a seal around cables passing through an opening of a sealed enclosure in an efficient and cost-effective manner.

In accordance with an aspect of the present invention, a cable sealing apparatus comprises a body including a plurality of grooves and a hinge. The body is foldable around the hinge to form a plurality of cable apertures from pairs of the grooves in a folded position. The body comprises a resilient material to form a seal around each cable disposed in a corresponding cable aperture upon being compressed by a force moving the body to the folded position.

In some embodiments, the body comprises an elastomeric material. The plurality of cable apertures have a plurality of sizes. The plurality of cable apertures are oriented parallel to each other. A plurality of plugs are insertable into the plurality of cable apertures. Each plug is removable from a corresponding cable aperture to permit a cable to be received into the cable aperture. The plurality of plugs are connected to a plug carrier. Each plug is separable from the plug carrier to remove the plug from the corresponding cable aperture. Each plug includes a sealing member disposed between a pair of grooves to seal a cable aperture formed by the pair of grooves in the folded position. The sealing member is captured in slots between the pair of grooves to seal the cable aperture in the folded position. A retainer is detachably connected to the body and including a handle to move the body. The hinge is a living hinge which allows the body to fold in a clam-shell manner. The body includes a locking mechanism to releasably lock the body in the folded position.

In accordance with another aspect of the invention, a cable sealing method comprises providing a body including a plurality of grooves and a hinge, placing a cable into one of the grooves, and folding the body around the hinge to form a cable aperture around the cable from a pairs of the grooves in a folded position. The body comprises a resilient material to form a seal around the cable disposed in the cable aperture upon being compressed by a force moving the body to the folded position.

In some embodiments, the body is pressed into an opening which compresses the resilient material of the body around the cable disposed in the cable aperture to form a seal around the cable. The body is locked in the folded position after folding the body around the hinge.

In accordance with another aspect of the present invention, a cable sealing apparatus comprises a body including a plurality of cable apertures each having a length. The body has a plurality of longitudinal slits each extending along the length of one of the cable apertures and disposed between the cable aperture and an external surface of the body. Each longitudinal slit is configured to be openable to receive a cable from the external surface of the body through the longitudinal slit into the cable aperture. The body comprises a resilient material to form a seal around each cable disposed in a corresponding cable aperture upon being compressed by a force generally transverse to a corresponding longitudinal slit.

In accordance with another aspect of the invention, a cable sealing method comprises providing a body including a plurality of cable apertures each having a length. The body has a plurality of longitudinal slits each extending along the length of one of the cable apertures and disposed between the cable aperture and an external surface of the body. The body comprises a resilient material. A cable is inserted into one of the cable apertures by opening a corresponding longitudinal slit and moving the cable from the external surface of the body through the longitudinal slit into the cable aperture. The body is pressed into an opening which compresses the resilient material of the body around the cable disposed in the cable aperture to form a seal around the cable.

In some embodiments, the plurality of cable apertures are parallel to each other, and a plurality of cables are inserted into the cable apertures to be oriented parallel to each other. The method may further comprise providing a plurality of plugs insertable into the plurality of cable apertures to seal the cable apertures which are not occupied by cables. The plurality of plugs are connected to a plug carrier. A plug for the cable aperture is removed from the plug carrier before inserting the cable into the cable aperture, and the remaining plugs that are connected to the plug carrier are inserted into the cable apertures to seal the cable apertures. The body is pressed into a wedge-shaped opening which compresses the resilient material of the body around the cable disposed in the cable aperture to form a seal around the cable.

In accordance with another aspect of the present invention, a cable sealing method comprises providing a body including a plurality of cable apertures each having a length. The body has a plurality of longitudinal slits each extending along the length of one of the cable apertures and disposed between the cable aperture and an external surface of the body. The body comprises a resilient material. A plug carrier has a plurality of plugs which are insertable into the plurality of cable apertures to seal the cable apertures. A plug is removed from the plug carrier to provide an open cable aperture. The remaining plugs that are connected to the plug carrier are inserted into the cable apertures to seal remaining cable apertures. A cable is inserted into the open cable aperture by opening a corresponding longitudinal slit and moving the cable from the external surface of the body through the longitudinal slit into the cable aperture.

DETAILED DESCRIPTION OF THE INVENTION

Figure 1:
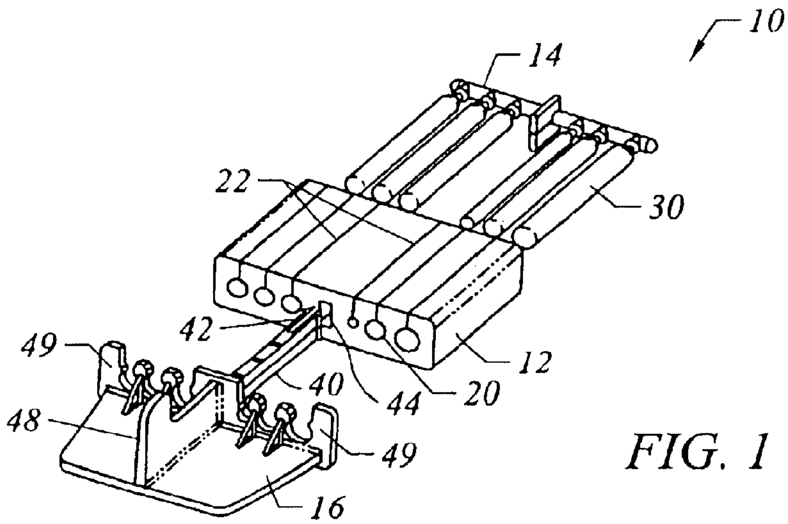
FIG. 1 is an exploded perspective view of a cable sealing apparatus according to an embodiment of the present invention.

FIG. 1 shows a cable sealing apparatus 10 including a body 12, a plug carrier 14, and a retainer 16. The body 12 shown is a block which is generally rectangular in shape. The body 12 includes a plurality of cable apertures 20, and a plurality of corresponding longitudinal slits 22 extending along the length of each of the cable apertures 20. The longitudinal slits 22 are disposed between the cable apertures and the external surface of the body 12. Each longitudinal slit is configured to be openable to receive a cable from the external surface of the body 12 through the longitudinal slit 22 into the corresponding cable aperture 20. The body 12 preferably is formed of a resilient material that deforms resiliently during insertion of the cables and forms a seal around each cable disposed in the corresponding cable aperture upon being compressed by a force generally transverse to the longitudinal slits. For example, the body 12 may be extruded from an elastomeric material.

As shown in FIG. 1, the cable apertures 20 may have different sizes to accommodate cables of different sizes. The cable apertures 20 are generally round, but may have other shapes. The cable apertures 20 do not need to match the shapes and sizes of the cables precisely because the resilient material of the body 12 allows the cable apertures 20 to seal around the cables by resilient deformation upon compression. In the embodiment shown, the cable apertures 20 are oriented parallel to each other, and the longitudinal slits 22 are disposed on one side of the body 12.

The plug carrier 14 includes a plurality of plugs 30 having ends connected thereto. As seen in FIG. 1, the plug carrier 14 includes a cross bar. The plugs 30 are aligned with and insertable into the cable apertures 20 of the body 12 to seal the cable apertures 20. Each plug 30 is removable from the plug carrier 14 to permit a cable to be received in the corresponding cable aperture 20. The plug 30 can be removed by disconnecting or breaking it from the plug carrier 14 at the end connection. In this way, the remaining plugs 30 seal those cable apertures 20 that are not occupied by cables. In other embodiments, the plugs 30 may be provided without a plug carrier.

The retainer 16 is detachably connected to the body 12. In the embodiment shown in FIG. 1, the retainer 16 includes a shaft or extension 40 having an enlarged head 42, which is compressible to fit through an opening or slot 44 provided in the body 12 and expands after passing through to the other side of the opening 44. The enlarged head 42 may be an arrow-shaped head having a slit that allows the head to be compressed resiliently to fit through the opening 44. The retainer 16 includes a handle 48. The retainer 16 has a plurality of cable panel clips 49 for securing the cables.

Figure 2:
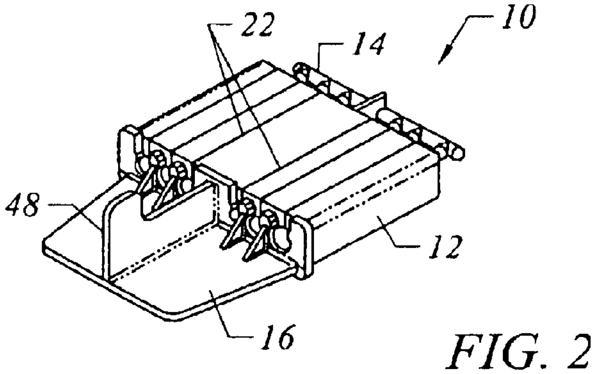
FIG. 2 is a perspective view of the cable sealing apparatus of FIG. 1.
Figure 3:
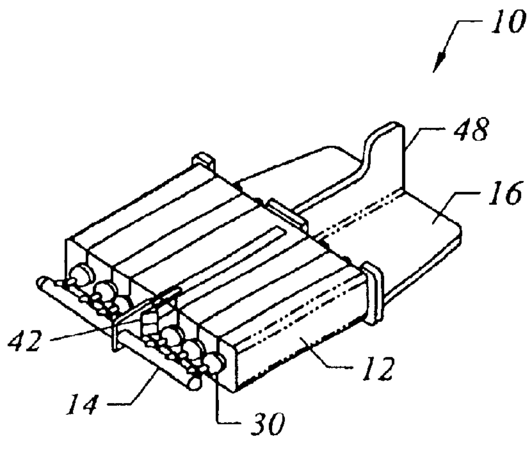
FIG. 3 is another perspective view of the cable sealing apparatus of FIG. 1.

FIGS. 2 and 3 show the assembled cable sealing apparatus 10. The plugs 30 on the plug carrier 14 are inserted into the cable apertures 20 of the body 14. The retainer 16 is connected to the body 14 by inserting the shaft 40 into the slot 44 of the body 14. Before inserting the cables, the user removes the appropriate plugs 30 from the plug carrier 14 to provide open cable apertures 20. The remaining cable apertures 20 are occupied by the remaining plugs 30.

Figure 4:
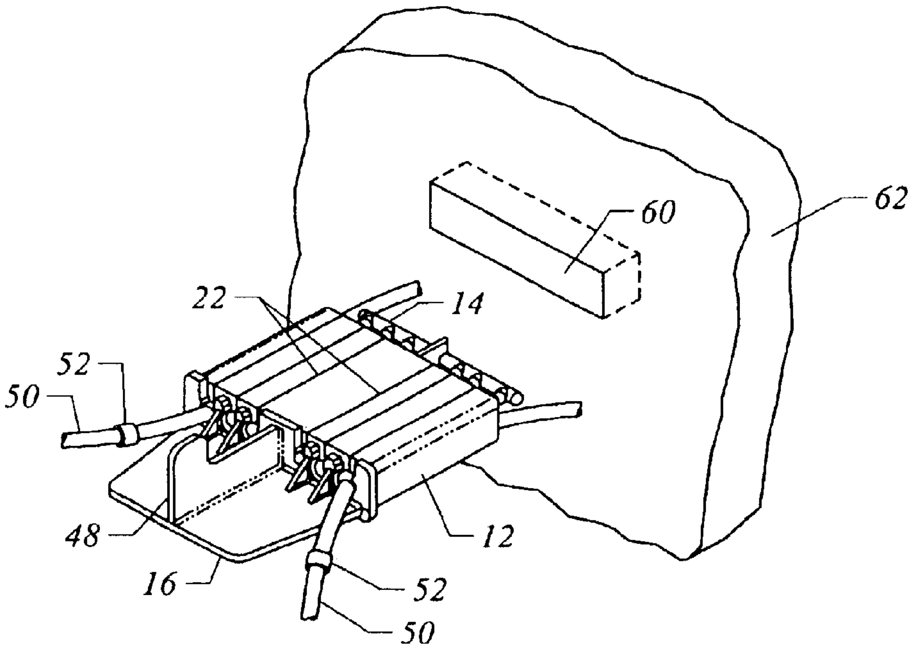
FIG. 4 is a perspective view of the cable sealing apparatus of FIG. 1 having cables inserted therein and being pressed into an opening for sealing.

FIG. 4 shows cables 50 inserted into some of the cable apertures 20. The cables 50 may include connectors 52 that make it difficult to pass through the apertures in the longitudinal direction. Because the cables 50 are inserted transversely into the cable apertures 20 through the slits 22, the problem can be avoided. The user then inserts the cable sealing assembly 10 into an opening 60 of an enclosure 62. The handle 48 on the retainer 16 provides the user with convenient handling of the apparatus 10. The opening 60 compresses the resilient material of the body 12 of the apparatus 10 to form a seal around the cables 50 and plugs 30 disposed in the cable apertures 20. Typically, the apparatus 10 is inserted from the outside to the inside of the sealed enclosure 62. In specific embodiments, the opening 60 may be wedge-shaped and decreases in size in the direction of insertion of the cable sealing apparatus 10.

Figure 5:
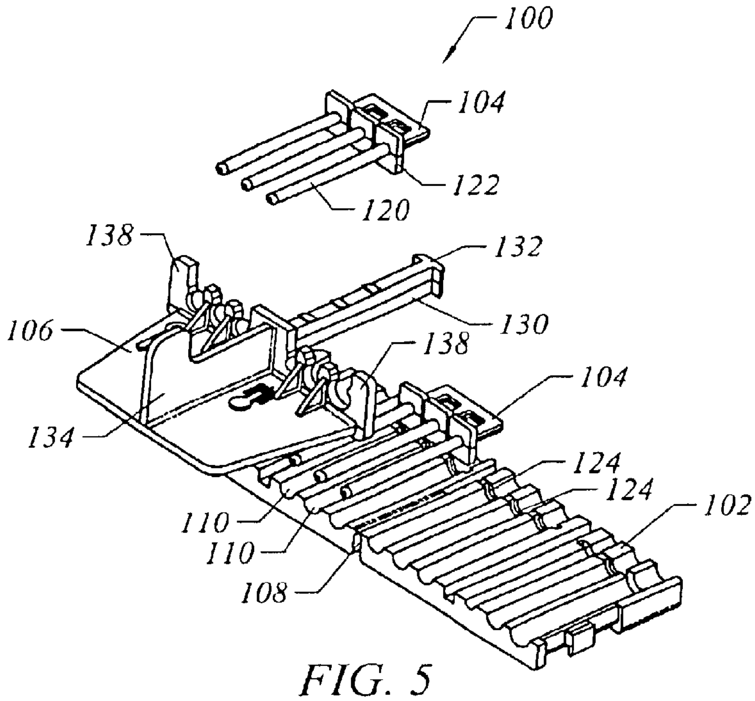
FIG. 5 is an exploded perspective view of a cable sealing apparatus according to another embodiment of the present invention.
Figure 6:
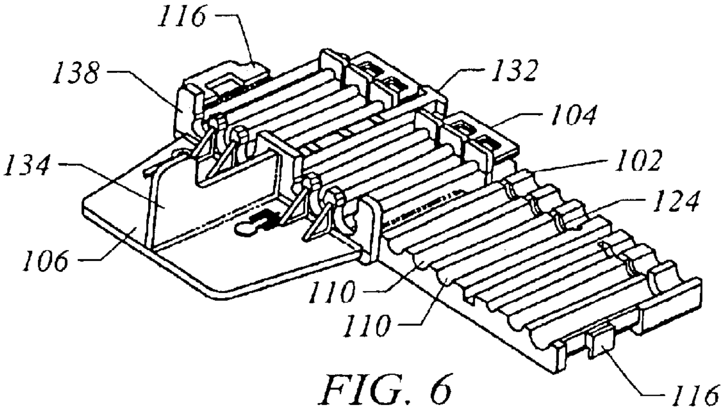
FIG. 6 is a perspective view of the cable sealing apparatus of FIG. 5 in an open position.
Figure 7:
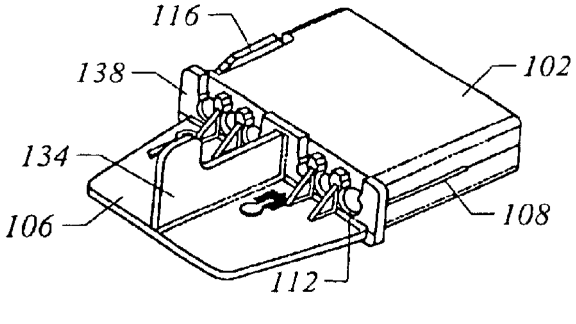
FIG. 7 is a perspective view of the cable sealing apparatus of FIG. 5 in a closed position.

FIGS. 5–10 show another cable sealing apparatus 100 having a body 102, one or more plug carriers 104, and a retainer 106. The body 102 includes a hinge 108 that allows the body 102 to open and close or fold in a clam-shell manner. FIG. 6 shows the body 102 in the open position, while FIG. 7 shows the body 102 in the closed or folded position. The hinge 108 is desirably a living hinge. The body 102 may be made of a plastic material, an elastomeric material, or the like. As seen in FIGS. 5 and 6, the body 102 includes a plurality of grooves 110 that form cable apertures 112 in the folded position of FIG. 7. A locking mechanism 116 may be provided to secure the body 102 in the closed position of FIG. 7. An example of a locking mechanism 116 is the flexible latch shown in FIG. 6. The grooves 10 may have different sizes for form different cable apertures 112 to accommodate cables of different sizes. The grooves 110 are oriented parallel to each other, but may have other configurations and arrangements in other embodiments.

The plug carrier 104 includes a plurality of plugs 120 having ends connected thereto. The plugs 120 are aligned with and insertable into the cable apertures 112. Each plug 120 is removable from the plug carrier 104 to permit a cable to be received in the corresponding cable aperture 112. The plugs 120 may be provided without the plug carrier 104 in other embodiments. The plugs 120 need not match the cable apertures 112 in size to provide sealing. Instead, the sealing is provided by the sealing members 122 inserted into slots 124 near the rear edge of the body 102. As a result, the plugs 120 may have the same size.

The retainer 106 is detachably connected to the body 102. In the embodiment shown in FIGS. 5–7, the retainer 106 includes a shaft or extension 130 having an enlarged head 132, which may be T-shaped, to engage the rear edge of the body 102. The retainer 106 includes a handle 134. The retainer 106 has a plurality of cable panel clips 138 for securing the cables.

Figure 8:
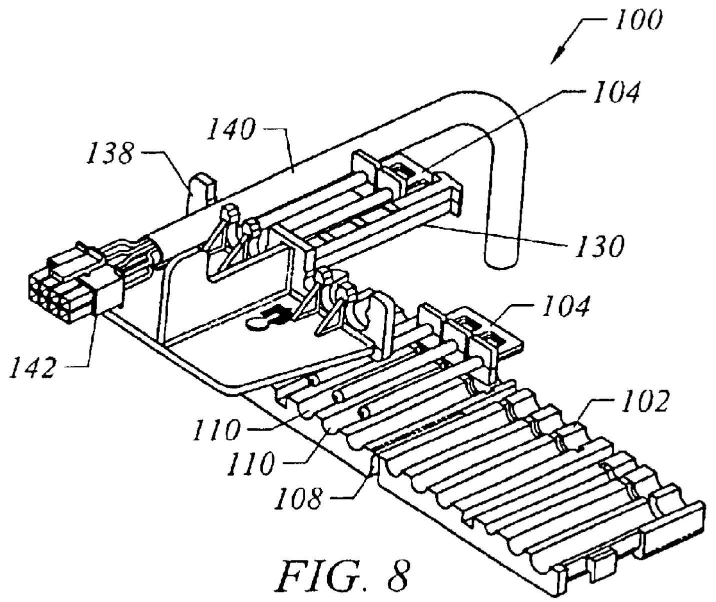
FIG. 8 is an exploded perspective view of the cable sealing apparatus of FIG. 5 having a cable inserted therein.
Figure 9:
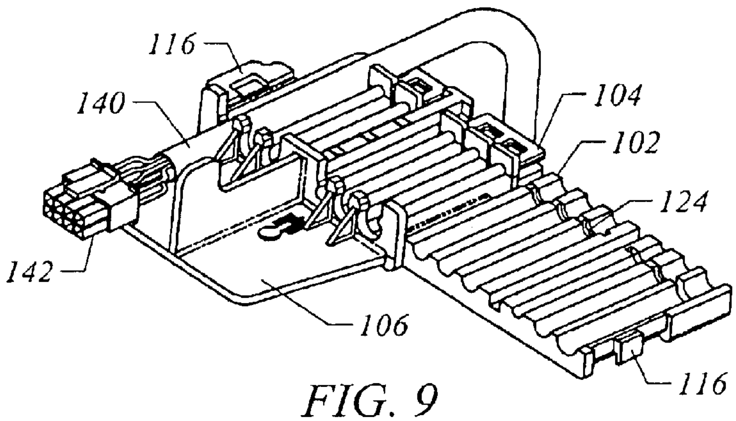
FIG. 9 is a perspective view of the cable sealing apparatus of FIG. 8 in an open position.
Figure 10:
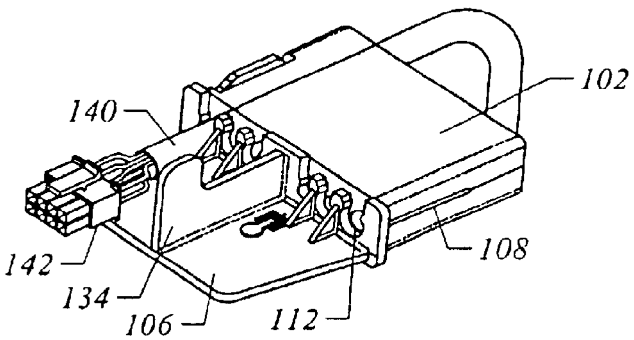
FIG. 10 is a perspective view of the cable sealing apparatus of FIG. 8 in a closed position.

FIGS. 8–10 show a cable 140 inserted into a cable aperture 112 formed by the grooves 110. The cable 140 includes a connector 142. Because the cable 140 is placed transversely into the body 102 which is then closed by rotating the clam shell around the hinge 108, the problem of inserting a cable with a connector through a cable aperture is avoided. The body 102 desirably includes a resilient material such as an elastomeric material that forms a seal around the cable inserted therein.

Because the cables are inserted transversely into the apertures through the slits or are placed between pairs of grooves in a clam-shell body, there is no need to pass cables assemblies with connectors through the apertures. The resilient body is then inserted into the opening of the sealed enclosure which is sized to compress the resilient body to form a seal around the cables. This design allows many cables to pass through the opening of the enclosure in a relatively small space.

The above-described arrangements of apparatus and methods are merely illustrative of applications of the principles of this invention and many other embodiments and modifications may be made without departing from the spirit and scope of the invention as defined in the claims. For instance, the body may have different shapes. The cable apertures may have different shapes. The cable apertures and longitudinal slits may be arranged differently in the body. The plugs for sealing the cable apertures that are not occupied by cables may be individually provided. The retainer may be connected to the body using other mechanisms. The scope of the invention should, therefore, be determined not with reference to the above description, but instead should be determined with reference to the appended claims along with their fill scope of equivalents.

What is claimed is:

1. A cable sealing apparatus comprising:

a body including a plurality of grooves and a hinge, the body being foldable around the hinge to form a plurality of cable apertures from pairs of the grooves in a folded position, the body comprising an elastomeric material to form a seal around each cable disposed in a corresponding cable aperture upon being compressed by a force moving the body to the folded position;

wherein each pair of the pairs of grooves are disposed opposite one another about the hinge to form one of the plurality of cable apertures, and the body includes a locking mechanism to releasably lock the body in the folded position.

2. The apparatus of claim 1 wherein the plurality of cable apertures have a plurality of sizes.

3. The apparatus of claim 1 wherein the plurality of cable apertures are oriented parallel to each other.

4. The apparatus of claim 1 further comprising a plurality of plugs insertable into the plurality of cable apertures, each plug being removable from a corresponding cable aperture to permit a cable to be received into the cable aperture.

5. The apparatus of claim 4 wherein the plurality of plugs are connected to a plug carrier, each plug being separable from the plug carrier to remove the plug from the corresponding cable aperture.

6. The apparatus of claim 4 wherein each plug includes a sealing member disposed between a pair of grooves to seal a cable aperture formed by the pair of grooves in the folded position.

7. The apparatus of claim 6 wherein the sealing member is captured in slots between the pair of grooves to seal the cable aperture in the folded position.

8. The apparatus of claim 1 further comprising a retainer detachably connected to the body and including a handle to insert the body into an opening of an enclosure.

9. The apparatus of claim 8 wherein the retainer includes a shaft adapted to detachably couple the retainer to the body through an aperture formed by folding the body around the hinge from a pair of the grooves.

10. The apparatus of claim 1 wherein the hinge is a living hinge which allows the body to fold in a clam-shell manner.

11. A cable sealing method comprising:

providing a body including a plurality of grooves and a hinge;

placing a cable into one of the grooves;

folding the body around hinge to form a cable aperture around the cable from a pairs of the grooves in a folded position, the body comprising an elastomeric material to form a seal around the cable disposed in the cable aperture upon being compressed by a force moving the body to the folded position; and locking the body in the folded position after folding after the body around the hinge;

wherein each pair of the pairs of the grooves are disposed opposite one another about the hinge to form one of the plurality of cable apertures.

12. The method of claim 11 further comprising pressing the body into an opening which compresses the resilient material of the body around the cable disposed in the cable aperture to form a seal around the cable.

13. The method of claim 11, wherein the body includes an integrated flexible latch.

14. The method of claim 11 further comprising providing a plurality of plugs, insertable into a plurality of cable apertures formed from pair of the grooves in the folded position, to seal the cable apertures which are not occupied by cables.

15. The method of claim 14 wherein the plurality of plugs are connected to a plug carrier, and further comprising removing a plug for the cable aperture from the plug carrier before inserting the cable into the cable aperture and inserting the remaining plugs that are connected to the plug carrier into the cable apertures to seal the cable apertures.

16. The method of claim 14 wherein each plug includes a sealing member disposed between the pair of grooves to seal the cable aperture formed by the pair of grooves in the folded position.

17. The apparatus of claim 1 wherein the body includes an integrated flexible latch to releasably lock the body in the folded position.

18. A cable sealing apparatus comprising:

a body including a plurality of grooves and a hinge, the body being foldable around the hinge to form a plurality of cable apertures from pairs of the grooves in a folded position, the body consisting essentially of an elastomeric material to form a seal around each cable disposed in a corresponding cable aperture upon being compressed by a force moving the body to the folded position, wherein each pair of the pairs of grooves are disposed opposite one another about the hinge to form one of the plurality of cable apertures, and the body includes a locking mechanism to releasably lock the body in the folded position.

* * * * *

UNITED STATES PATENT AND TRADEMARK OFFICE

CERTIFICATE OF CORRECTION

PATENT NO. : 6,888,067 B1
DATED : May 3, 2005
INVENTOR(S) : David Howland

It is certified that error appears in the above-identified patent and that said Letters Patent is hereby corrected as shown below:

Column 6,
Line 11, should read as -- around the cable from a pair of the grooves in a folded --, not "around the cable from a pairs of the grooves in a folded".

Signed and Sealed this

Twenty-second Day of November, 2005

JON W. DUDAS
*Director of the United States Patent and Trademark Office*